United States Patent [19]

Matthews

[11] 4,077,220

[45] Mar. 7, 1978

[54] GRAVITY HEAD GEOTHERMAL ENERGY CONVERSION SYSTEM

[75] Inventor: Hugh B. Matthews, Boylston, Mass.

[73] Assignee: Sperry Rand Corporation, New York, N.Y.

[21] Appl. No.: 740,282

[22] Filed: Nov. 9, 1976

[51] Int. Cl.$^2$ ............................................... F03G 7/00
[52] U.S. Cl. ........................................ 60/641; 60/657; 417/366; 417/379; 417/405
[58] Field of Search ........................... 60/641, 646, 657; 417/379, 405, 366; 184/6

[56] References Cited

U.S. PATENT DOCUMENTS

| | | | |
|---|---|---|---|
| 3,824,793 | 7/1974 | Matthews | 60/641 |
| 3,898,020 | 8/1975 | Matthews | 60/641 X |
| 3,905,196 | 9/1975 | Govindarajan | 60/641 |
| 3,908,380 | 9/1975 | Lobach | 60/641 |
| 3,910,050 | 10/1975 | Matthews et al. | 60/641 |
| 3,938,334 | 2/1976 | Matthews | 60/641 |
| 3,939,659 | 2/1976 | Matthews | 60/641 |

Primary Examiner—Allen M. Ostrager
Attorney, Agent, or Firm—Howard P. Terry

[57] ABSTRACT

A geothermal energy recovery system of improved life duration makes use of thermal energy stored in hot, solute-bearing well water as it is pumped upward to the earth's surface through an extended heat exchange element for continuously heating a downward flowing organic working fluid to a supercritical state. Some of the energy of the latter fluid is used within the well for operating a turbine-driven pump for pumping the hot well water at high pressure and always in liquid state to the earth's surface, where it is reinjected into the earth in a second well. After driving the deep-well turbine-driven pump, the organic fluid still in supercritical state arises toward the earth's surface in a thermally insulated conduit; at the earth's surface, vapor turbine electrical power generation equipment is driven by the ascending organic fluid, after which it is returned into the well for re-heating in the extended heat exchanger. The invention provides a long life, closed-loop fluid lubricant pumping and cooling system for the bearings of the turbine and brine pump system, normally isolated from the working fluid loop and the hot brine pumping and heat exchange loop. Should the pressure level within the lubricant loop fall below a predetermined level, auxiliary means are provided for coupling working fluid into the lubrication loop to maintain the pressure within the loop above that of the hot brine, thus excluding intrusion of the corrosive brine.

12 Claims, 3 Drawing Figures

GRAVITY HEAD GEOTHERMAL ENERGY CONVERSION SYSTEM

BACKGROUND OF THE INVENTION

1. Field of the Invention

The invention relates generally to efficient means for the generation of electrical or other power utilizing energy from subterranean geothermal sources and, more particularly, relates to novel bearing and bearing lubrication arrangements for providing long-life and efficient deep well heat exchange and pumping equipment finding application in deep, hot brine wells for the transfer of thermal energy for use at the earth's surface.

2. Description of the Prior Art

A basic advance in the geothermal power extraction art, not limited to use with the rare dry steam geothermal sources and also devoid of the steam and geothermal brine separation problem and the consequent corrosion problems attached to prior art systems using mixed steam and hot water supply wells, was presented in the H. B. Matthews U.S. Pat. No. 3,824,793, issued Oct. 24, 1972 for a "Geothermal System and Method", and in the divisional application which resulted in the U.S. Pat. No. 3,898,020 of the same title, issued May 8, 1974.

Improvements in the basic Matthews concept appear in more recently filed U.S. patents, also assigned to Sperry Rand Corporation:

K. E. Nichols et al. U.S. Pat. No. 3,905,196, issued Sept. 16, 1975 for a "Geothermal Energy Pump Thrust Balance Apparatus", J. L. Lobach U.S. Pat. No. 3,908,380, issued Sept. 30, 1975 for a "Geothermal Energy Turbine and Well System", and H. B. Matthews et al. U.S. Pat. No. 3,910,050, issued Oct. 7, 1975 for a "Geothermal Energy System and Control Apparatus". The five aforementioned patents disclose geothermal energy recovery systems making use of thermal energy stored by subterranean heat sources in hot, solute-bearing well water to generate super-heated steam from a surface-injected flow of clean water; the super-heated system is then used to operate a turbine-driven pump within the well for pumping the hot brine at high pressure and always in liquid state to the earth's surface, where it transfers its heat in a binary closed-loop heat exchanger-vapor turbine-alternator combination for generation of electrical power. Residual brine is pumped back into the earth, while the clean, cooled water is regenerated at the surface-located system and is returned to the deep well pumping system for generating steam and also for lubrication of fluid bearings supporting the turbine-driven pump system. The latter three patents concern a similar system, illustrating improvement features in the form of hydrodynamic radial and thrust bearings and pressurized liquid bearing lubrication means. A reverse flow, deep well steam turbine motor of compact nature is also disclosed, along with features of the surface control and power generation systems.

In the H. B. Matthews U.S. patent application Ser. No. 674,243 for a "Geothermal Energy Conversion System", filed Apr. 6, 1976 and also assigned to Sperry Rand Corporation, there is disclosed a further improvement in geothermal energy extraction systems which reduces the initial and operating costs of the apparatus, eliminating certain surface and down-well elements and providing apparatus of reduced complexity and considerably enhanced efficiency. This latter gravity head geothermal energy recovery system makes use of thermal energy stored in hot, solute-bearing well water particularly during the period that is pumped upward to the earth's surface through an extended lineal heat exchange element for continuously heating a downward flowing organic working fluid. The added energy of the latter fluid is then used within the well for operating a turbine-driven pump for pumping the hot, solute-bearing well water at high pressure and always in liquid state to the earth's surface, where it is reinjected into the earth by a sump well. The temperature difference between the upward flowing brine and the downward flowing organic working fluid is maintained along the length of the subterranean extended heat exchange element. After driving the deep well turbine-driven pump, the organic fluid arises to the earth's surface in a thermally insulated conduit. At the earth's surface, electrical power generating equipment is driven by the ascended organic fluid, after which it is returned into the well for reheating as it travels downward in the extended heat exchanger.

SUMMARY OF THE INVENTION

According to the present invention, there is provided apparatus useful in any of several types of geothermal systems when an organic working fluid is employed for providing longlife and reliable operation of the bearings of the down-well turbine-driven brine pumping apparatus. A closed-loop fluid lubricant pumping and lubricant cooling system is provided for the primary bearings, is normally isolated from the organic working fluid loop and, more important, remains isolated from the hot brine pumping and heat extraction loop so that the hot corrosive brine solution being pumped by the system is efficiently excluded from the primary bearings. The lubricant pump is mounted directly on the primary bearing shaft, providing further assurance that the high pressure fluid lubricant remains uncontaminated by corrosive solutes. Should the pressure level of the lubricant fluid fall below a predetermined value, normally inoperative means acts to couple the high pressure working fluid into the lubrication loop to maintain the pressure therein above that of the brine, thus assuring continued exclusion of corrosive brine and preventing damage of the bearing system.

DESCRIPTION OF THE PREFERRED EMBODIMENTS

Figure 1:
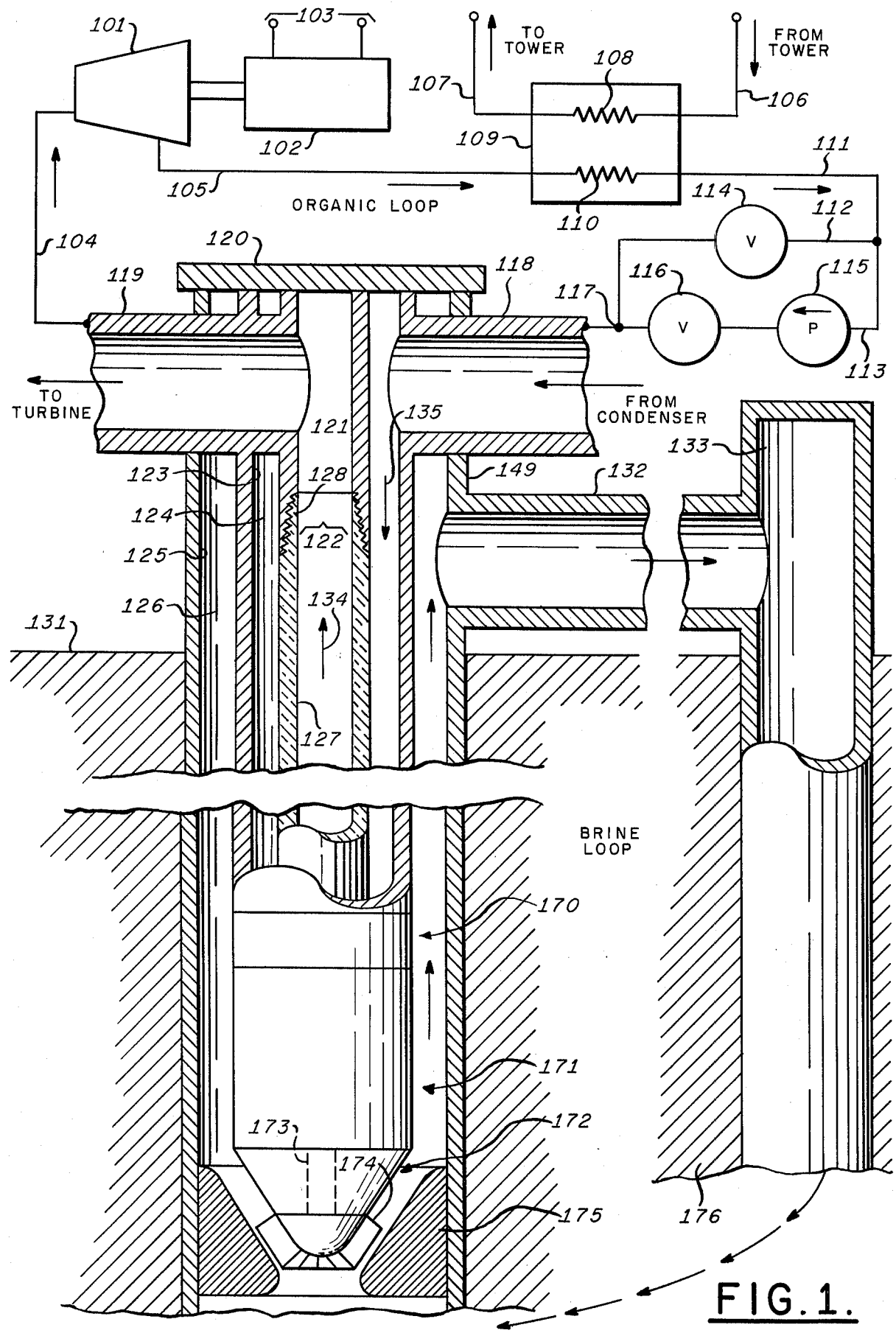
FIG. 1 is an elevation view, partly in cross section of the novel geothermal energy recovery apparatus lubrication system and of cooperating surface control and power generation apparatus.

FIG. 1 illustrates the general structure and characteristics of the prior art gravity head, geothermal energy recovery system described in the aforementioned Matthews U.S. patent application Ser. No. 674,243. While the present invention is described as employed in such a particular gravity head type of energy extraction system, it will readily be understood by those skilled in the art that the scope of the invention includes its application to other geothermal energy recovery systems, including those of the aforementioned Matthews U.S. Pat. Nos. 3,824,793 and 3,910,050, for example. The typical gravity head geothermal energy extraction system includes a surface energy conversion system and a cooperating geothermal energy extraction system, which latter is immersed in a deep well extending into strata far below the earth's surface, preferably being located at a depth such that a copious supply of extremely hot water under high pressure is reliably available. The deep well apparatus includes an active brine pumping structure disposed within a generally conventional well casing 125 below the level at which flashing would ordinarily take place. The representative configuration of FIG. 1 includes a well head section 149 located partly above the earth's surface 131 and extending downward therefrom. Toward the geothermal source, extensions of the well piping directly join a fluid turbine motor section 170, a supporting rotary bearing section 171, and a hot water pumping section 172 following in close succession at increasing depths.

The well casing 125 extends downward from the surface capping or header plate 120, surrounding in generally concentric relation a relatively large pipe 123 cooperatively forming a conduit 126 for permitting upward flow of the hot geothermal brine always in liquid state. An annular conduit 124 is formed between pipe 123 and an innermost pipe 121 permitting downward flow, for example, of an organic fluid in its supercritical state in the sense of arrow 135 for driving the fluid turbine motor within turbine section 170. After driving the turbine, the partially cooled organic fluid is returned without phase change, for example, in the sense of arrow 134 in the conduit 122 formed by pipe 121.

Intensive heat exchange is achieved through the walls of pipe 123 between the upward flowing hot geothermal water and the down-flowing working fluid being converted to supercritical state in annular conduit 124. On the other hand, heat flow between the working fluid within annular conduit 124 and that flowing upward in the innermost conduit 122 is substantially diminished. For this purpose, only a small portion of pipe 121 may be made of metal, the major portion of the conduit being defined by a pipe constructed of a thermally insulating material. Such an insulating pipe is indicated in FIG. 1 as pipe 127 and is joined to the well head metal inner pipe 121 in a conventional manner, as by threaded joint 128. The insulating pipe 127 may be similarly attached at threaded joint 129 (FIG. 2) to a metal pipe 130 located within the fluid turbine motor section 170. Pipe 127 may be constructed in a conventional manner of molded refractory materials cast with a suitable binder and may contain glass, asbestos, or similar fibers. Alternatively, pipe 127 may be a steel pipe with a layer of conventional powdered thermal insulator material sprayed or otherwise bonded to one or both of its cylindrical surfaces in a conventional manner. At the low end of the operating temperature scale, reenforced plastic pipes are suitable. It will be understood that a conventional alloy pipe will be employed in certain prior art systems such as illustrated in the aforementioned Matthews et al patent 3,824,793.

With the pump in pump section 172 operating, geothermal fluid is propelled upward in conduit 126 always in liquid state by the action of pump vanes 174 driven via shaft 173 by the fluid turbine motor of section 170 and of shroud 175. During its ascent within conduit 126, there is intensive heat transfer through the walls of pipe 123 into the downwardly flowing working fluid in conduit 124. The geothermal brine flows upward in conduit 126 and out through branching outlet pipe 132 at the earth's surface 131, thus being conducted in considerably cooled form to a reinjection well 133. Accordingly, the energy extraction cycle may be continuously repeated, the brine being used over and over.

The organic working fluid introduced by branching surface pipe 118 into conduit 124 flows downward in the well between the thermally conductive pipe 123 and the thermally insulative pipe 127 in considerable volume so that a major part of the geothermal energy is transferred to the working fluid by the time the latter reaches the turbine motor of section 170 in supercritical state. After furnishing energy for driving the turbine, the shaft 173, the vanes 174 of the brine pump, the partially cooled fluid may flow upward in conduit 122 without change of state and out through series branching pipes 119, 104 to the input of a conventional multistage vapor turbine motor 101. In this manner, energy is provided by the vapor forming at the input nozzles of turbine 101 to drive the surface-located alternator or generator 102 for supplying electrical power at output terminals 103.

The vapor consequently appearing at the output stage of turbine 101 and flowing through pipe 105 is reconverted into a liquid by the action of condenser element 110 of the condenser 109. Cooling of the conventional condenser 109 is provided by a flow of water, for example, from a cooling tower (not shown) through pipe 106, condenser element 108, and back to the tower through pipe 107. In normal operation, the organic working fluid flows through pipes 111, 112, the open valve 114, through tee 117, and into branching pipe 118 for recycling. Valve 114 will be closed only in unusual circumstances, such as, for example, in start-up of the system; then, valve 116 is opened and pump 115 is operated to provide flow through pipe 113, pump 115, valve 116, and tee 117 and thus to afford sufficient pressure to start the down-well turbine motor of section 170, after which normal operation is continued with valve 116 closed while valve 114 is reopened.

The apparatus of FIG. 1 is characterized by having two operational loops, whereas systems of the type described in the aforementioned Matthews et al. U.S. Pat. No. 3,824,793 employ more complex operation, being concerned with the use of three operational loops. The two loops of the FIG. 1 system are:

(1) a geothermal Brine Loop involving conduit 126, pipe 132, reinjection well 133, and the pervious strata 176 connecting the bottoms of the wells, and (2) an entirely distinct loop which may be called the Organic Loop involving flow of organic fluid through pipes 111, 112, 118, well conduit 126, the fluid turbine motor in section 170, conduit 122, pipes 118, 104, vapor turbine 101, and heat exchanger element 110. In the operation of the Brine Loop, the brine solution is pumped upward from the bottom of casing 125 through the down-well pump at section 172 and has pressure added to it to move it above the earth's surface 131. The flowing brine transfers substantially all of its available heat through the walls of the lengthy heat exchanger pipe 123 into the organic fluid in conduit 124 of the Organic Loop. After driving the fluid turbine motor in turbine section 170, the organic working fluid arrives at the earth's surface 131 at a relatively lowered temperature, for example, such as 120° to 150° F., where the brine in the well source is at about 300° F., depending in a conventional manner upon the temperature of the ultimate heat sink. The temperature of the brine in conduit 126 is continuously reduced as it rises and its pressure also continuously drops; accordingly, there is no need for the down-well pump of section 172 to add significant pressure to prevent flashing of the brine and all of the work done by the down-well pump simply goes into overcoming flow friction losses.

While the earlier triple loop systems used highly energetic steam as a working fluid and while the present invention is compatible for operation with such a working fluid, the specific system of FIG. 1 preferably employs an organic fluid characterized by relatively constant specific heat over the operating temperature range. This relatively constant specific heat characteristic can be achieved with any of a wide range of organic fluids generally suitable for use in thermodynamic systems, including isobutane, propane, propylene, difluoromethane ($CH_2F_2$), and other commonly used high molecular weight refrigerants of the halogen-substituted hydrocarbon or chlorofluorocarbon type, for example, $CClF_2 — CClF_2$, $CCl_3F$, or $CClF_2 — CF_3$.

According to the present invention, a closed but replenishable Lubrication Loop is added to the dual loop system of FIG. 1 that is also equally adaptable for use in triple loop systems such as that of the aforementioned Matthews et al. U.S. Pat. No. 3,824,793; it will be described with respect to FIGS. 2 and 3. In order to present the structure and operation of the novel Lubrication Loop, it will be appropriate to describe the structure of the down-well turbine motor, bearing, and pump systems in which the loop operates.

Figure 2:
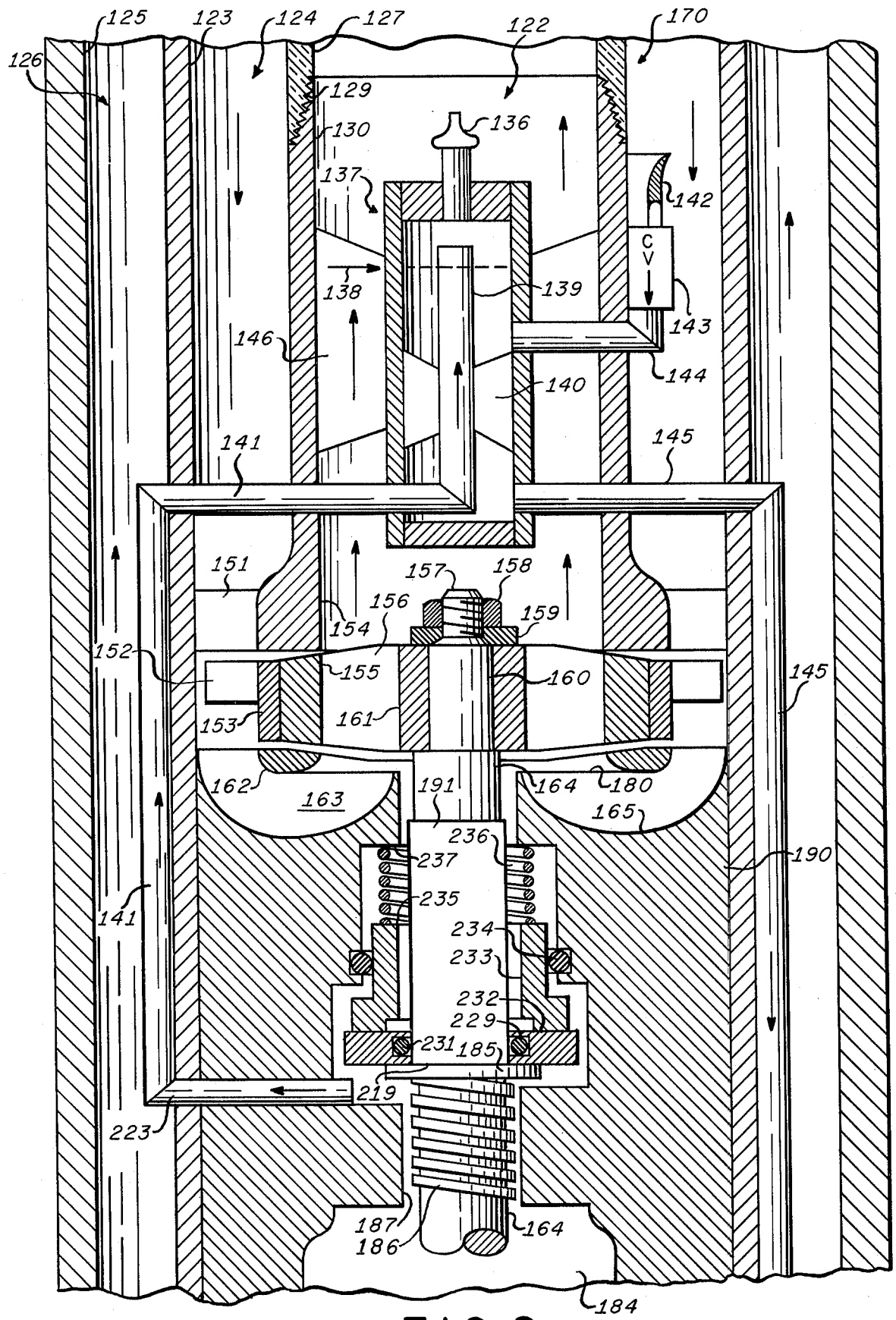
FIG. 2 is a partial elevation view, partly in cross-section, of the down-well turbine section of FIG. 1, illustrating the location of lubricant reservoir, reservoir cooling and replenishment, sealing, and lubricant pumping portions of the invention.

A preferred form of the thermodynamically driven turbine motor of the turbine motor section 170 of FIG. 1 is shown in detail in FIG. 2. It will be readily apparent that the turbine motor is generally similar in form to the motor employed in the aforementioned Lobach U.S. Pat. No. 3,908,380, for example, though its dimensions may be somewhat modified in a conventional manner for operation in the Organic Loop, as described in further detail in the aforementioned Matthews U.S. patent application Ser. No. 674,243. In particular, if steam is not used as the working fluid, the turbine motor is modified in a conventional manner for receiving a large volume flow of a working organic fluid held in its supercritical state. For lubrication of the supporting thrust and radial bearings, a closed loop lubrication system is provided and the bearing system is modified to prevent loss of the lubricant both into the turbine exhaust and into the geothermal brine solution. Should lubricant leakage occur, however, the Lubrication Loop is automatically connected to the working organic fluid inlet of the turbine motor for providing emergency lubrication of the bearings, thus greatly extending the operating life of the pump.

Referring particularly to FIG. 2, it is seen that the concentric conduits 122, 124, 126 extend into the fluid turbine section 170. The heated organic fluid flowing in conduit 124 flows into an array of injection nozzles 151 of generally conventional design supported on enlargement 154. The nozzles 151 are employed in the usual manner to direct a large volume flow of fluid in supercritical state against the impact blades 152 of the turbine motor. The ring holder 153 bearing the arrays of vanes 152 is fixed in a conventional manner to a turbine wheel 152, the latter being a part of a wheel additionally supplied with a set of spokes 156 and a hub 161. Hub 161, when the rotor system is rotating, causes shaft portions 160, 164, 194, and 173 to rotate, hub 161 being securely fastened on shaft portion 160 by washer 159 and a nut 158 secured to a threaded extension 157 of shaft portion 160, for example.

The turbine motor system features an arrangement for redirecting the flowing organic working fluid, still in supercritical state, for upward flow in the insulated inner or exhaust conduit 122. For this purpose, the turbine body block 190 contains an annular, smoothly curved toroidal passageway 163 issuing from the rotating blade array 152 radially inward toward shaft portion 160, at the same time altering the direction of fluid flow so that it is caused to flow upwardly. The toroidal passageway 163 is defined by a suitably expanding curved surface 165 cast within body block 190 and by the surface of the opposed annular ring or guide 162. Ring guide 162 may be supported by an array of radially extending vanes 180 which, in addition to supporting ring 162, also tend to redirect the exhaust liquid so that its velocity vector becomes primarily vertical. Accordingly, it is seen that there is formed a smooth-sided toroidal supercritical fluid expansion passageway directing the expanding liquid after it leaves the array of blades 152 until it passes through the spoke 156 of the turbine motor wheel. The passage of the working organic liquid between spokes 156 is facilitated generally as described in the aforementioned Lobach patent 3,908,380 for facilitating passage of steam through a generally similar turbine wheel. Again, spokes 156 may be individually tilted with respect to the direction of rotation of rim 155 so that their effect at the selected rotational speed of the turbine is essentially neutral, the angle of incidence of spokes 156 with respect to the direction of flow of the working liquid again being such that they neither add energy nor subtract energy from the fluid stream flowing upward in conduit 122.

Figure 3:
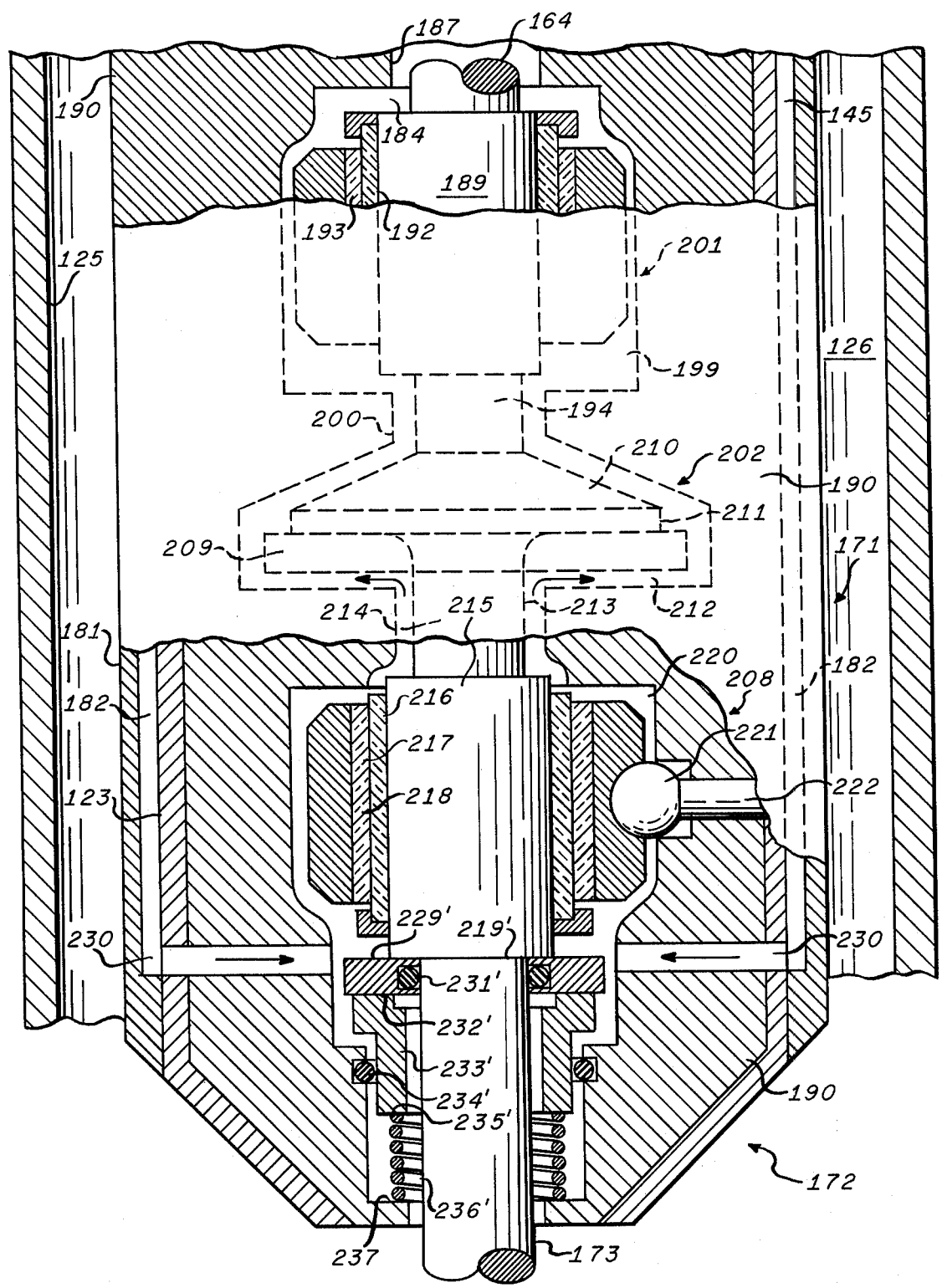
FIG. 3 is a partial elevation view, partly in cross-section, of bearing elements of the geothermal system lubricated according to the invention.

FIG. 3 illustrates the primary fluid bearing system for supporting shaft portion 160 and the fluid turbine motor within body block 190; the system includes an upper radial bearing 201, a thrust bearing 202, and a lower radial bearing 208. The respective upper and lower radial bearings 201 and 208 may be similar and will be described by reference to the lower bearing. They may be of conventional nature or may be a bearing subtantially like the tilting pad arrangement of the aforementioned Nichols et al. U.S. Pat. No. 3,905,196 in which the shaft portion 215 is surrounded by a hollow cylinder 216 of aluminum oxide affixed to the shaft. In the usual instance, three independent tilting pad bearing surfaces cooperate with the bearing surface of the aluminum oxide cylinder 216, a typical construction employing a fastener including a pad positioning shaft 222 which resides in a bore in body block 190. Pad positioner shaft 222 is located according to the setting of a radially adjustable threaded portion (not shown), shaft 222 accommodating a hardened steel sphere 221 partially residing in a counter-bore. Sphere 221 projects into the interior of body block 190, where it thrusts against a mating depression in the bearing support block 218. To its inner arcuate surface is affixed an arcuate sector 217 made of aluminum oxide. The sector 217 and cylinder 216 have contiguous bearing surfaces between which resides a thin lubricant film. In practice, three similar tilting pad bearings are often used in the radial bearing fully to establish the actual position of shaft portion 215. It will be evident that the upper radial bearing system of FIG. 2 employing shaft bearing portion 189 may duplicate that of the lower radial bearing.

Between the two radial bearing units associated with shaft portions 189 and 215 is located a thrust bearing system 202 shown in dotted lines and which may also be generally the same as that additionally disclosed in the aforementioned Nichols et al. U.S. Pat. No. 3,905,196. The tilting pad thrust bearing system 202 includes, for example, an enlarged tapered portion 210 for supplying a horizontal interface element 211. The lower or thrust surface of element 211 may be constituted of a flat ceramic ring. The ring 209 schematically represents, for example, the multiple tilting pad thrust bearing system of the Nichols et al patent having plural ceramic bearing surfaces cooperating with the lower or bearing surface of element 211. The bearing surface of element 211 and the horizontal bearing surfaces of the tilting pads cooperate in determining the vertical position of shaft portions 194, 214, 215, as is also discussed in the Matthews U.S. Pat. No. 3,910,050.

In order to confine the lubrication fluid within the cavity in body block 190 so as to prevent any substantial loss of the fluid, appropriate shaft seals are employed at shaft portions 164 and 173 at each end of the bearing section 171, these seals also functioning to exclude corrosive brine well water from the body block interior.

With respect to the upper seal at shaft portion 191, it is seen in FIG. 2 that the upper face 219 of the enlarged shaft portion 185 bears against the lower face of an apertured ring 229. Supplied with an O-ring 231 engaging the cylindrical surface of shaft portion 191, ring 229 tends to rotate with the shaft. Ring 229 forms a conventional pressure balanced seal with the lower surface 232 of a stationary portion 233 of the seal. Passage of lubricant fluid upward is further eliminated by an O-ring 234 captured within a groove in body block 190 and engaging the outer cylindrical surface of stationary seal portion 233. A helical spring 236, affixed at its upper end at 237 to body block 190, is affixed at its lower end to the top 235 of stationary seal portion 233. Thereby, elements 229 and 233 are held in contiguous relation, their interface 232 being lubricated by the lubricant fluid. Alternatively, a spring bellows hermetically sealed to surfaces 235 and 237 may be employed in lieu of spring 236. The O-ring 234 may be found unnecessary in the latter construction. The structure of the second seal cooperating with shaft portion 215 is similar and corresponding components of the second seal bear the same reference numerals, but they are primed.

The cavity in body block 190 surrounding the primary bearings 201, 202, 208 is provided with circulating lubricant by apparatus now to be described with respect to FIGS. 2 and 3. In FIG. 2, a lubricant reservoir 137 is disposed at the axis of the turbine motor exhaust conduit 122, being supported therein from pipe 130 by a plurality of radial vanes 146. As part of the closed Lubrication Loop, reservoir 137 as well as the remainder of the loop is filled at the time of installation of the system with a suitable liquid lubricant to the level indicated by arrow 138, for example, The pressure of the lubricant within reservoir 137 is then raised to a value well above that of the brine pressure at the lower shaft seal by application of an inert gas such as nitrogen under pressure to the filler tube 136, which is then hermetically sealed in the conventional manner. It is to be observed that reservoir 137 is supported in the coolest part of the energy extraction system where it is cooled by an exhaust fluid flowing upward in supercritical state from the turbine motor rotor. Those skilled in the art will understand that the drawings are not necessarily made to a scale or in such proportions as would be used in all practical applications, but are made with the view of providing a clear understanding of the invention. Generally, it is preferred to extend reservoir 137 some considerable distance upward within conduit 122 to enhance the consequent cooling of the lubricant. Reservoir 137 may contain five to ten times the volume of the remainder of the Lubricant Loop, for example.

The lubricant is conveyed from the lower part of reservoir 137 into the primary bearing cavity of FIG. 3 by a relatively small pipe 145 projecting radially through pipes 130 and 123, whereupon it joins a vertically aligned and thermally insulated pipe 145 on the outside of pipe 123 within conduit 126. The lubricant may flow directly into the bearing system via pipes 145 and 182 and bore 230, the radial bore 230 providing a passageway through body block 190 into the bearing cavity. If desired, pipe 145 may flow into an annular passage at 182, so that more than one radial bore 230 may be employed.

The lubricant passes through channel or channels 230 into a cavity 220 surrounding the lower radial bearing at shaft portion 215. There, the interfaces between alumina cylinder 216 and bearing pads 217 are bathed in the lubricant as the fluid passes upward through channel 213 into the thrust bearing associated with the cooperating elements 209, 210, 211. Flowing through series channels 213, 212, 200, it similarly lubricates the associated mating thrust bearing surfaces. Flowing upward next through the annular channel 200 around shaft portion 194 in FIG. 3, the lubricant emerges in the cavity 199 surrounding the upper radial bearing at shaft portion 189, lubricating the contiguous surfaces of the ceramic bearing elements 192, 193. Finally, as seen in FIG. 2, the fluid is pumped upward by a simple screw pump 186 located on shaft portion 164, through annular channel 187, and is exhausted into the radial bore 223 through block 190. Bore 223 connects to a generally vertical pipe 141 located, on a wall of pipe 123 within conduit 126. Upon reaching the level of reservoir 137, pipe 141 is turned radially inwardly, the lubricant then passing through pipes 123, 130 and into the lower end of reservoir 137. There, it connects to a vertical standpipe 139 supported in reservoir 137 by a plurality of vanes 140. In this manner, cooled lubricant taken under pressure from the lower part of reservoir 137 is connected to the lower part of the bearing containing cavity, and successively lubricates and cools bearings 208, 202, 201 and is pumped upward by pump 186 into the top of reservoir 137, again to be cooled at the lowest temperature site in the down-well system. In this manner, efficient and long life operation of the bearing system in the hazardous environment characterizing geothermal wells is assured.

Reservoir 137 is further provided with a radial input pipe 144 passing through pipe 130 into the working organic fluid conduit 124; through check valve 143, pipe 144 is coupled to an intake scoop 142. Valve 143 is normally closed as long as the pressure within reservoir 137 is at a suitable elevated pressure level. Should the lubricant pressure eventually fall within reservoir 137, the pressure level within conduit 124 is sufficient to open the one-way check value 143, and a corresponding amount of organic working fluid is permitted to enter reservoir 137. It will be understood, of course, that the pressure level of the organic working fluid is also significantly above that of the brine itself. It is preferred that the working organic fluid and the lubricant oil be mutually soluble or miscible materials under the working conditions, such as is the case with many readily available refrigerant and other organic fluids and with ordinary petroleum lubricating oils. In this manner, by connecting the pressure reservoir 137 to the source 142 of organic fluid before the latter reaches the turbine motor through a properly directed check valve 143, the working fluid readily flows into reservoir 137, maintaining the pressure therein well above that of the brine should the original pressure within the reservoir 137 fall by a predetermined amount.

Accordingly, it is seen that down-well geothermal energy extraction apparatus is afforded improved reliability and an increased life span through the provision of a novel closed-loop fluid lubricant pumping and cooling system for the primary bearings of the turbine-brine pump shaft, the Lubricant Loop being normally isolated from the organic working fluid and particularly isolated from disasterous effects resulting from intrusion of corrosive hot brine into the primary shaft bearings. In addition, the lubricant is efficiently cooled, even in the hot environment of the geothermal well, further assuring long-life operation of the bearings. Reliability and long-life are further enhanced by the novel arrangement for substituting working fluid under pressure for any lost lubricant, assuring the continued cooling and lubrication of the bearings and the continued exclusion of corrosive liquid from the bearing region.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Geothermal deep well pumping apparatus located at a subterranean source of geothermal well fluid of the kind including geothermal energy exchange means for providing a working fluid and motor and motor-driven pump rotor means responsive to said working fluid for pumping said geothermal fluid always in liquid state for flow in cooperative energy exchange relation with respect to said geothermal exchange means toward the earth's surface, further including:
   conduit means for conveying said working fluid after driving said motor and motor-driven pump rotor means toward the earth's surface,
   lubricant reservoir means supported in heat transfer relation within said conduit means for cooling lubricant fluid contained under pressure within said reservoir means,
   cavity-defining body means within said deep well pumping apparatus;
   bearing means having bearing stator means affixed within said cavity-defining body means,
   shaft means journalled in said bearing means for supporting in common said motor and motor-driven pump rotor means, and
   lubricant pump means within said cavity-defining body means responsive to rotation of said shaft means for continuously circulating said lubricant fluid through the cavity of said cavity-defining body means for lubricating said bearing means and returning said lubricant fluid to said lubricant reservoir means for cooling.

2. Apparatus as described in claim 1 wherein said motor rotor comprises fluid turbine rotor means driven by an organic working fluid.

3. Apparatus as described in claim 2 additionally including first seal means disposed adjacent a first end of said cavity-defining body means on said shaft means preventing substantial transmission of fluids between said fluid turbine means and said cavity.

4. Apparatus as described in claim 3 additionally including second seal means disposed adjacent a second end of said cavity-defining body means on said shaft means for preventing substantial transmission of fluids between said cavity and said subterranean source.

5. Apparatus as described in claim 2 wherein said lubricant fluid comprises an organic petroleum liquid.

6. Apparatus as described in claim 5 wherein said lubricant fluid is soluble in said working fluid.

7. Apparatus as described in claim 2 wherein the pressure level of said lubricant fluid is normally maintained above the operating pressure level of said working fluid, said working fluid pressure level being higher than the pressure level of said geothermal fluid.

8. Apparatus as described in claim 7 wherein said lubricant reservoir means contains a major portion of said lubricant fluid and a minor portion of an inert gas under pressure.

9. Apparatus as described in claim 2 including unilateral means for coupling said working fluid into said lubricant reservoir when the pressure within said lubricant reservoir falls below a predetermined value.

10. Apparatus as described in claim 9 wherein said unilateral means comprises:
    input means coupled to said working fluid before said working fluid drives said motor means, and
    check valve means operative at said predetermined pressure for permitting flow of said working fluid into said lubricant reservoir.

11. Apparatus as described in claim 8 wherein said inert gas comprises nitrogen.

12. Apparatus as described in claim 2 wherein said lubricant reservoir means comprises hollow cylindrical means mounted substantially coaxially within said conduit means.

* * * * *